US010367789B2

(12) United States Patent
Sun (10) Patent No.: US 10,367,789 B2
(45) Date of Patent: Jul. 30, 2019

(54) DATA SYNCHRONIZATION METHOD AND APPARATUS (71) Applicant: Alibaba Group Holding Limited, Grand Cayman (KY)

(72) Inventor: Yuanbo Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 240 days.

(21) Appl. No.: 15/469,297

(22) Filed: Mar. 24, 2017

(65) Prior Publication Data
US 2017/0201502 A1    Jul. 13, 2017

Related U.S. Application Data (63) Continuation of application No. PCT/CN2015/089956, filed on Sep. 18, 2015.

(30) Foreign Application Priority Data

Sep. 28, 2014   (CN) .......................... 2014 1 0510426

(51) Int. Cl.
*H04L 29/06* (2006.01)
*H04L 9/30* (2006.01)
(Continued)

(52) U.S. Cl.
CPC .......... *H04L 63/0428* (2013.01); *G06F 11/14* (2013.01); *G06F 16/00* (2019.01); *G06F 16/27* (2019.01); *G06F 21/60* (2013.01); *G06F 21/6218* (2013.01); *H04L 9/30* (2013.01); *H04L 67/1065* (2013.01)

(58) Field of Classification Search
CPC .................................................. H04L 63/0428
See application file for complete search history.

(56) References Cited

U.S. PATENT DOCUMENTS 5,870,595 A  *  2/1999  Oki ...................... G06F 1/3228
                                                     713/601
8,131,672 B2 *  3/2012  Hind .................... G06F 16/275
                                                     707/610

(Continued)

FOREIGN PATENT DOCUMENTS

CN          1384436 A      12/2002
CN          1940873 A       4/2007
(Continued)

OTHER PUBLICATIONS

Translated Chinese Office Action from corresponding CN patent application U.S. Appl. No. 15/469,297, dated Apr. 2, 2018, 7 pages.
(Continued)

*Primary Examiner* — Shawnchoy Rahman
(74) *Attorney, Agent, or Firm* — Lee & Hayes, P.C.

(57) ABSTRACT

The present disclosure provides a data synchronization method and apparatus, for synchronizing data between a first system and a second system on a same terminal. Data stored in a storage area corresponding to the first system of the terminal is retrieved; the retrieved data is sent to a remote device to process the data; the processed data is sent back to the terminal and stored in a storage area corresponding to the second system.

17 Claims, 4 Drawing Sheets

(51) Int. Cl.
*H04L 29/08* (2006.01)
*G06F 11/14* (2006.01)
*G06F 21/60* (2013.01)
*G06F 21/62* (2013.01)
*G06F 16/00* (2019.01)
*G06F 16/27* (2019.01)

(56) References Cited

U.S. PATENT DOCUMENTS

| | | | | |
|---|---|---|---|---|
| 8,315,976 | B2* | 11/2012 | Multer | G06F 16/178 707/610 |
| 8,983,464 | B2* | 3/2015 | Mori | H04W 48/18 455/435.2 |
| 2003/0188115 | A1* | 10/2003 | Maezawa | G06F 9/4418 711/162 |
| 2004/0203965 | A1* | 10/2004 | Robinson | H04B 7/2662 455/502 |
| 2004/0215909 | A1 | 10/2004 | Imai et al. | |
| 2005/0182922 | A1 | 8/2005 | Guo et al. | |
| 2010/0031325 | A1 | 2/2010 | Maigne et al. | |
| 2011/0173460 | A1* | 7/2011 | Ito | H04L 9/0836 713/193 |
| 2014/0041050 | A1 | 2/2014 | Heider | |
| 2018/0020228 | A1* | 1/2018 | Wu | H04N 19/436 |

FOREIGN PATENT DOCUMENTS

| | | |
|---|---|---|
| CN | 101256527 | 9/2008 |
| CN | 101382908 A | 3/2009 |
| CN | 102638578 | 8/2012 |
| CN | 103078989 A | 5/2013 |
| CN | 103198239 A | 7/2013 |
| CN | 103745155 A | 4/2014 |
| CN | 103778389 A | 5/2014 |
| CN | 103986837 | 8/2014 |
| EP | 2034403 A1 * 3/2009 | G06F 9/45558 |
| EP | 2759955 | 7/2014 |
| JP | 2004326278 A | 11/2004 |
| JP | 2005346731 A | 12/2005 |
| JP | 2009530715 A | 8/2009 |
| WO | WO2014043056 A1 | 3/2014 |

OTHER PUBLICATIONS

Jun et al., "Design and Implementation of Trusted Execution Environment in Domestic Autonomous Platform," North China Institute of Computing Technology, Computer Engineering and Design, Oct. 2012, vol. 33 No. 10, 8 pages.
Translated Search Report from corresponding CN patent application No. 201410510426.1, dated Mar. 21, 2018, 2 pages.
Wang Xi-You, "Research and Application of Armtrustzon E Security Isolation Technology," China Master's Thesis Submitted to University of Electronic Science and Technology of China published Jan. 15, 2014, see abstract p. 5, 76 pages.
Ekberg, et. al., "The Untrapped Potential of Trusted Execution Environments on Mobile Devices", Security & Privacy, IEEE, IEEE Service Center, Los Alamitos, CA, US, vol. 12, No. 4, Jul. 1, 2014, ISSN: 1540-7993, DOI: 10.1109/MSP.2014.38, 9 pages.
The Extended European Search Report dated Mar. 9, 2018, for European Application No. 15843317.7, 8 pages.
"GlobalPlatform Devicce Technology TEE Internal API Specification", Retrieved from Internet : URL:http://www.globalplatform. org/specificationsdevice.asp, pp. 1-202.
Translation of International Search Report from corresponding PCT application No. PCT/CN2015/089956 dated Dec. 2, 2015, 2 pages.
Translation of Written Opinion from corresponding PCT application No. PCT/CN2015/089956 dated Dec. 2, 2015, 5 pages.
The Japanese Office Action dated Mar. 26, 2019 for Japanese Patent Application No. 2017-516737, a counterpart of U.S. Appl. No. 15/469,297, 9 pages.

* cited by examiner

DATA SYNCHRONIZATION METHOD AND APPARATUS

CROSS REFERENCE TO RELATED PATENT APPLICATIONS

This application claims priority to and is a continuation of PCT Patent Application No. PCT/CN2015/089956, filed on 18 Sep. 2015, which claims priority to Chinese Patent Application No. 201410510426.1, filed on 28 Sep. 2014, entitled "DATA SYNCHRONIZATION METHOD AND APPARATUS," which are hereby incorporated by reference in their entirety.

TECHNICAL FIELD

The present disclosure relates to the field of computer technologies and, in particular, to a data synchronization method and apparatus.

BACKGROUND ART

With the rapid development of mobile communication technologies, terminals such as smart phones and tablet computers are configured with independent systems, and most terminals are configured with open systems. For example, the Android system is a typical open system.

In an application scenario, data that is generated from operations performed by a user on an Application (APP) on a terminal with an open system is stored in a storage area corresponding to the open system. Data in the storage area corresponding to the open system may be accessed by other APPs, that is, data in the storage area corresponding to the open system is exposed in an open environment; therefore, in the open system, security of key data generated from some operations (for example, operations such as inputting key data of a user) with a high security requirement cannot be ensured.

To ensure the security of key data, currently, in addition to the open system, the terminal is further configured with a closed system that is independent from and coexists in parallel with the open system; for example, the Trusted Execution Environment (TEE) is a typical closed system. When the user performs some operations with a high security requirement, the closed system may be started, and operations are performed in the closed system. All key data generated from operations performed in the closed system is stored in a storage area corresponding to the closed system, and only APPs authenticated by the closed system are allowed to access the closed system. In other words, data in the storage area corresponding to the closed system is not allowed to be accessed by applications not authenticated by the closed system. Therefore, the security of key data can be effectively ensured.

Although the closed system can solve the security issue of key data, there are other issues. For an APP, data generated from operations performed by a user on the APP in an open system is stored in a storage area corresponding to the open system, while data generated from operations performed on the APP in a closed system is stored in a storage area corresponding to the closed system. The data stored in the two storage areas together is complete data corresponding to the APP, and the complete data of the APP is stored in different storage areas on a terminal.

However, for data stored in the storage area corresponding to the open system, the data may be lost or tampered with because it is exposed in an open environment. For data stored in the storage area corresponding to the closed system, when some hardware of the terminal is damaged, the data may be lost. For the APP, data in the two storage areas is indispensable, and loss or tampering of data in either storage area may cause the APP to fail to run normally.

BRIEF DESCRIPTION OF THE DRAWINGS

The accompanying drawings described herein, as a part of the present disclosure, are used to provide further illustration of the present disclosure. The schematic examples of the present disclosure and the description thereof are merely used for illustrating the present disclosure, but do not constitute any improper limitation to the present disclosure. In the drawings.

DETAILED DESCRIPTION

Example implementations of the present disclosure provide a data synchronization method and apparatus, to solve, among others, the problems that once data in a storage area corresponding to either an open system or a closed system installed on a terminal is lost, an APP cannot run normally.

To achieve the foregoing objective, an example of the present disclosure provides a data synchronization method, where a first system and a second system are both installed in a first device, and the method includes:

retrieving data from a storage area corresponding to the first system;

sending the data to a second device for the second device to process the data;

starting the second system upon receiving processed data returned by the second device; and storing, through the second system, the processed data into a storage area corresponding to the second system.

An example of the present disclosure provides another data synchronization method, where a first system and a second system are both installed in a first device, and the method includes:

receiving data sent by the first device, where the data is data retrieved by the first device from a storage area corresponding to the first system;

processing the data; and sending the processed data to the first device for the first device to, upon receiving the processed data, start the second system, and store, through the second system, the processed data into a storage area corresponding to the second system.

An example of the present disclosure provides a data synchronization apparatus, where a first system and a second system are both installed in the apparatus, and the apparatus includes:

a data retrieval module configured to retrieve data from a storage area corresponding to the first system;

a data sending module configured to send the data to a second device for the second device to process the data;

the data retrieval module being further configured to receive processed data returned by the second device;

a second system starting module configured to start the second system after the data retrieval module receives the processed data returned by the second device; and a data storage module configured to store, through the second system, the processed data into a storage area corresponding to the second system.

An example of the present disclosure provides another data synchronization apparatus, where a first system and a second system are both installed in a first device, and the apparatus includes:

a data receiving module configured to receive data sent by the first device, wherein the data is data retrieved by the first device from a storage area corresponding to the first system;

a data processing module configured to process the data; and a data sending module configured to send the processed data to the first device for the first device to, upon receiving the processed data, start the second system, and store, through the second system, the processed data into a storage area corresponding to the second system.

A first device of the present disclosure may not directly process data for the purpose of the synchronization, but may send data retrieved, through a first system, from a storage area corresponding to the first system to a second device so that the second device may process the received data and return the processed data to the first device; after receiving the processed data returned by the second device, the first device starts a second system, and stores, through the second system, the processed data into a storage area corresponding to the second system, thus synchronizing the data in the storage area corresponding to the first system to the storage area corresponding to the second system.

In the existing solutions, for complete data corresponding to an APP, a part of the data is saved in a storage area corresponding to an open system of a first device, another part of data is saved in a storage area corresponding to a closed system of the first device, and the APP cannot run normally so long as data in either storage area is lost or tampered with. Therefore, in the present disclosure, data stored in two storage areas may be backed up for each other, that is, complete data corresponding to an APP is saved in both the storage area corresponding to the open system and the storage area corresponding to the closed system. In this way, if data in one storage area is lost or tampered with, the APP can still run normally based on data in the other storage area.

The technical solutions of the present disclosure are described herein with reference to the examples and the corresponding drawings. Apparently, the described examples are merely some but not all of the examples of the present disclosure. All other examples appreciated and/or derived by people of ordinary skill in the art without creative efforts based on the examples described in the present disclosure shall fall into the scope of the present disclosure.

Data synchronization methods provided in the examples of the present disclosure will be specifically described herein.

Figure 1:
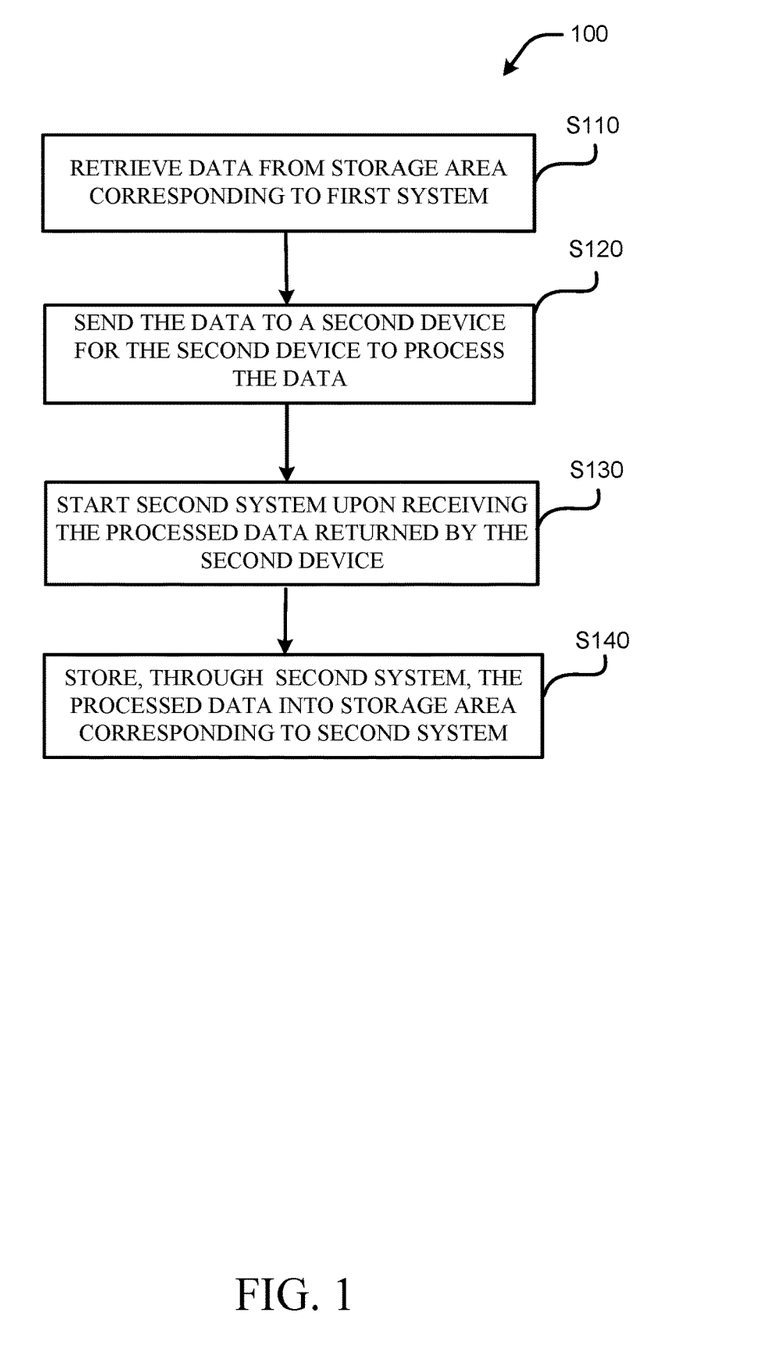
FIG. 1 is an example general schematic flowchart of an example data synchronization method.

Referring to FIG. 1, an example data synchronization method 100 provided in an example of the present disclosure is shown. Example method 100 may include the following operations.

S110: Retrieve data from a storage area corresponding to a first system.

In this example of the present disclosure, a first system and a second system are both installed in the first device, wherein the first system may be an open system, and the second system may be a closed system. Or, the first system may be a closed system, and the second system may be an open system. The first device may be a terminal, or may be a server or another device installed with an operating system.

When the first device retrieves data from the storage area corresponding to the first system, the first system may be started first, and for an APP, data corresponding to the APP is retrieved, through the first system, from the storage area corresponding to the first system. Wherein, the data may be data generated from operations performed by a user on the APP in the first system. For example, the data may be data generated from operations performed, in the first system, by the user on a payment APP, a communication APP, and the like installed on the first device.

For illustrative purposes only, the following description uses an illustrative example where the first device may be a terminal and the second device may be a network device. Wherein, the first system installed on the terminal is an Android system (i.e., an open system) and the second system is a TEE system (i.e., a closed system), and the APP on the terminal is a payment APP that has been authenticated by the TEE system.

It is assumed that the payment APP is started in an environment of the Android system, that is, the Android system is already started currently, and data currently saved in a storage area corresponding to the Android system is data generated from operations of uploading an avatar performed by the user (the data is not key data, that is, the data is non-key data, and is referred to as avatar data hereinafter). In this case, when the terminal determines that the data in the Android system needs to be synchronized into the TEE system, the avatar data corresponding to the payment APP may be retrieved, through the started Android system, from the storage area corresponding to the Android system.

S120: send the retrieved data to a second device for the second device to process the data.

In an application scenario, after retrieving the data from the storage area corresponding to the first system, and before synchronizing the retrieved data to a storage area corresponding to the second system, the first device may further perform some processing, such as de-duplication processing, on the retrieved data. However, due to a limited data processing capacity of the APP, the efficiency is relatively low when the first device processes the retrieved data by using the APP, or it is even impossible to process the data by using the APP. Therefore, in this example, after retrieving the data from the storage area corresponding to the first system, the first device may further send the data to the second device for the second device to process the received data.

Continue with the above illustrative example: after retrieving the avatar data from the storage area corresponding to the Android system through process S110, the terminal sends the avatar data to the network device (such as a business server) through the Android system, such that the network device may process the received avatar data.

The avatar data may include all historical avatar pictures uploaded by the user, and generally, the APP needs only a latest uploaded avatar picture. Therefore, after receiving the avatar data, the network device may extract a latest uploaded avatar picture from the avatar data as processed avatar data, and return the processed avatar data to the terminal.

S130: Start a second system upon receiving the processed data returned by the second device.

In an application scenario, for the two types of systems: the open system and the closed system, when one system is started, the other system is in a dormant state; besides, when the storage area corresponding to a system is operated, the operation needs to be performed through this system. Therefore, when receiving the processed data returned by the network device, the terminal may start the second system, and enable the first system to hibernate.

Specifically, when receiving the processed data returned by the network device, the device may first temporarily save the processed data in another storage area (such as a cache) independent from the storage areas corresponding to the first system and the second system, and then start the second system.

Continue with the above illustrative example: when receiving the processed avatar data returned by the network device through process S120, the terminal first stores the processed avatar data into a cache, and then starts the TEE system and enables the Android system to hibernate.

S140: Store the processed data, through the second system, into a storage area corresponding to the second system.

Continue with the above illustrative example: after starting the TEE system, the terminal retrieves, through the TEE system, the processed avatar data saved in the cache, and then stores, through the TEE system, the processed avatar data into a storage area corresponding to the TEE system.

Certainly, in the above illustrative example, for merely illustrative purpose, an Android system is described as the first system and a TEE system is described as the second system. When the first system is a TEE system and the second system is an Android system, a method of synchronizing key data (such as password data) saved in a storage area corresponding to the TEE system to a storage area corresponding to the Android system may be similar, and the details are not needed to be provided herein again.

Through the above method, after data synchronization, for an APP, both the storage area corresponding to the first system and the storage area corresponding to the second system include complete data corresponding to the APP. That is, both storage areas include not only key data generated from operations performed by the user on the APP in the TEE system, but also include non-key data generated from operations performed by the user on the APP in the Android system. Therefore, when data in either of the two storage areas is lost or tampered with, data can also be retrieved from the other storage area, thus effectively ensuring normal running of the APP.

In this example of the present disclosure, to ensure that the data is not tampered with by a third party when the terminal sends the retrieved data to the network device through process S120, before sending the retrieved data to the network device, the terminal may further encrypt the data, and then send the encrypted data to the network device.

Correspondingly, after receiving the encrypted data, the network device may first decrypt the encrypted data, and then process the decrypted data.

Specifically, the encryption may be performed by using an asymmetric encryption algorithm. For example, the terminal may first encrypt the data by using a pre-saved private key, and sends the encrypted data to the network device; after receiving the encrypted data, the network device decrypts the encrypted data by using a pre-saved public key, and then processes the decrypted data.

Certainly, it is also possible to use a digital signature to ensure that the data is not tampered with when being sent to the network device from the terminal. For example, also with an asymmetric encryption algorithm, the terminal may generate a signature of the data by using a pre-saved private key, and then send the data together with the signature to the network device; after receiving the data and the signature, the network device first verifies the received signature by using a pre-saved public key, and processes the data when the verification succeeds, or refuses to process the data when the verification fails.

Similarly, to ensure that the processed data is not tampered with by a third party when the network device returns the processed data to the terminal, before sending the processed data to the terminal, the network device may also encrypt the processed data, and then return the encrypted processed data to the terminal.

Correspondingly, after receiving the encrypted processed data returned by the network device, the terminal may first decrypt the encrypted processed data, to obtain the processed data, and then store, through the started second system, the processed data obtained through decryption into the storage area corresponding to the second system.

In this example of the present disclosure, the terminal may perform the method shown in FIG. 1 only when it is determined that the data in the storage area corresponding to the first system needs to be synchronized to the storage area corresponding to the second system.

Specifically, each time the terminal stores the processed data returned by the network device into the storage area corresponding to the second system, a storage time of the stored data may be recorded. Then, when judging whether the data in the storage area corresponding to the first system needs to be synchronized to the storage area corresponding to the second system, the terminal may determine a recorded last storage time at which the processed data returned by the network device is stored into the storage area corresponding to the second system, and judge whether a period of time from the determined last storage time to a current time exceeds a preset threshold (i.e., a preset synchronization cycle). If yes, the terminal executes the method shown in FIG. 1 to synchronize the data in the storage area corresponding to the first system to the storage area corresponding to the second system; otherwise, the terminal does not perform the method temporarily.

For example, the terminal may monitor a period of time between a current time and a last storage time in real time, and when the period of time exceeds the preset threshold, it is determined that the data in the storage area corresponding to the first system needs to be synchronized to the storage area corresponding to the second system, that is, it is determined to perform the method shown in FIG. 1.

Certainly, the storage time may also be recorded by the network device, and the network device judges whether the terminal needs to synchronize the data in the storage area corresponding to the first system to the storage area corresponding to the second system. That is, the network device monitors the period of time between the current time and the last storage time, and when it is monitored that the period of time exceeds the preset threshold, the network device determines that the terminal needs to synchronize the data in the storage area corresponding to the first system to the storage area corresponding to the second system. In this case, the network device may send a notification message to the terminal to instruct the terminal to perform the method shown in FIG. 1.

In this example of the present disclosure, the terminal may monitor, through the APP, whether the data needs to be synchronized, and may also receive, by through APP, the notification message sent by the network device to trigger the data synchronization process shown in FIG. 1. That is, when the APP monitors that data needs to be synchronized or receives a notification message sent by the network device, the APP may retrieve, through a currently started first system, data in the storage area corresponding to the first system, and then the APP sends the retrieved data to the network device for processing; upon receiving the processed data returned by the network device, the APP triggers the terminal to start the second system, and stores, through the second system, the processed data into the storage area corresponding to the second system, as shown in FIG. 1.

Figure 2:
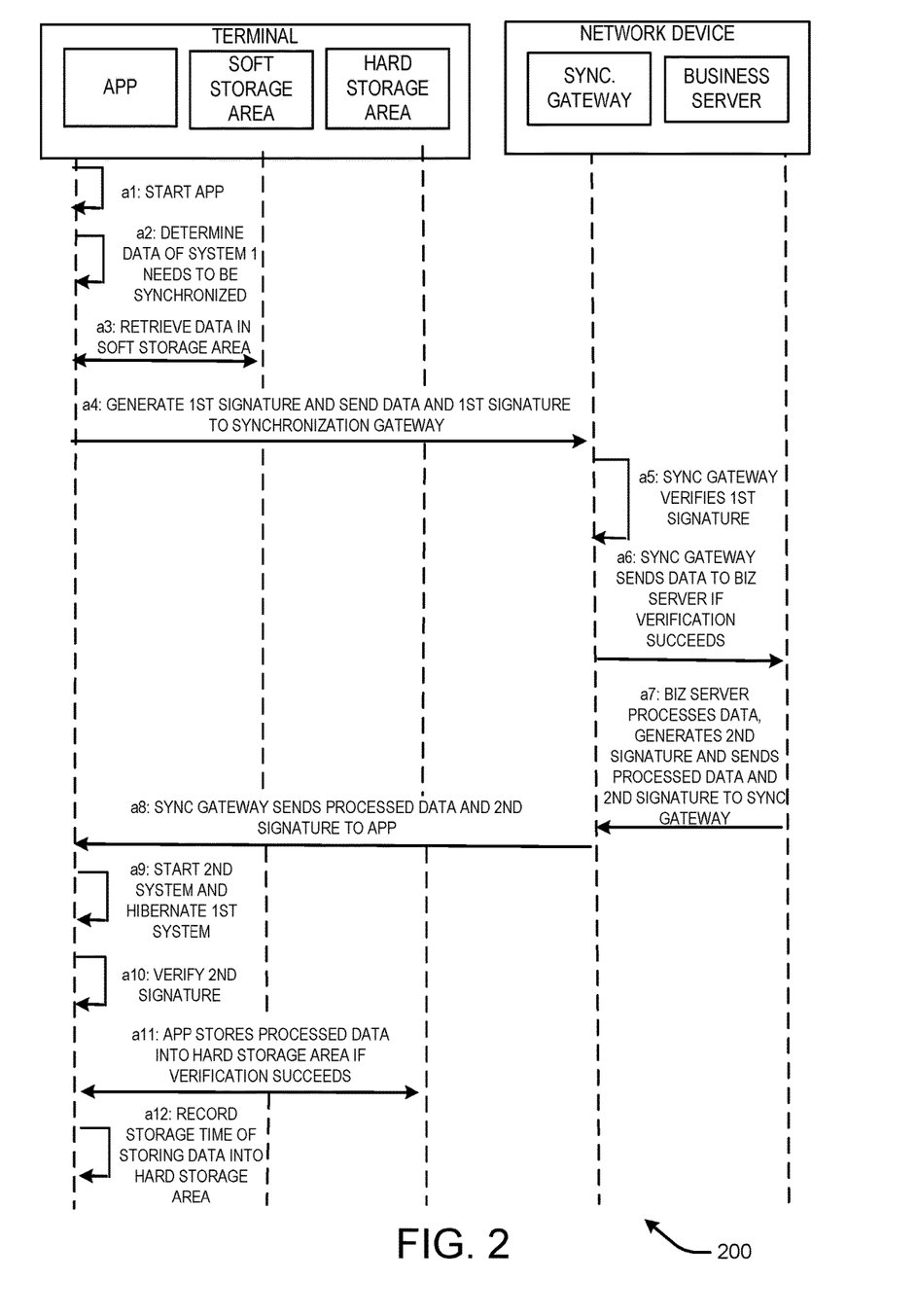
FIG. 2 is an example specific schematic flowchart of an example data synchronization method.

The first system being an open system and the second system being a closed system is taken as an example for description below. Wherein, the first device may be a terminal, and the second device may be a network device including a synchronization gateway and a business server.

Referring to FIG. 2, another example data synchronization method 200 includes the following operations:

Process a1: A terminal starts a first system, enables a second system to hibernate, and starts an APP.

A storage area corresponding to the first system may be referred to as a soft storage area, and a storage area corresponding to the second system may be referred to as a hard storage area.

Process a2: The APP determines that data of the first system currently needs to be synchronized to the second system.

Process a3: The APP calls a soft storage interface, and retrieves data in the soft storage area through the soft storage interface.

Wherein the soft storage interface is an interface, provided by the first system, for the APP to store data into/retrieve data from the soft storage area.

Process a4: The APP generates a first signature of the retrieved data, and sends the data and the first signature to a synchronization gateway.

Process a5: The synchronization gateway verifies the first signature.

Process a6: The synchronization gateway sends the received data to a business server if the verification succeeds.

If the first signature fails to pass the verification of the synchronization gateway, the synchronization gateway may directly return a synchronization rejection message to the terminal, and discard the data and the first signature.

Process a7: The business server processes the received data, generates a second signature of the processed data, and sends the processed data and the second signature to the synchronization gateway.

Process a8: The synchronization gateway sends the processed data and the second signature to the APP.

Process a9: The APP triggers the terminal to start the second system and enable the first system to hibernate.

Process a10: The APP verifies the second signature.

Process a11: The APP calls a hard storage interface when the verification succeeds, and stores the processed data into a hard storage area through the hard storage interface.

When the second signature fails to pass the verification of the APP, the APP may directly discard the processed data and the second signature.

Process a12: The APP records a storage time of current storage of the data into the hard storage area.

In addition, the first signature may also be generated by the soft storage interface, and the hard storage interface verifies the second signature returned by the synchronization gateway, which is not described in detail herein.

In this example of the present disclosure, after processing the received data, in addition to returning the processed data to the terminal, the network device may further save the processed data. When data in the storage areas corresponding to the first system and the second system of the terminal is both lost or tampered with, the terminal may further retrieve data from the network device, thus further ensuring normal running of the APP.

Figure 3:
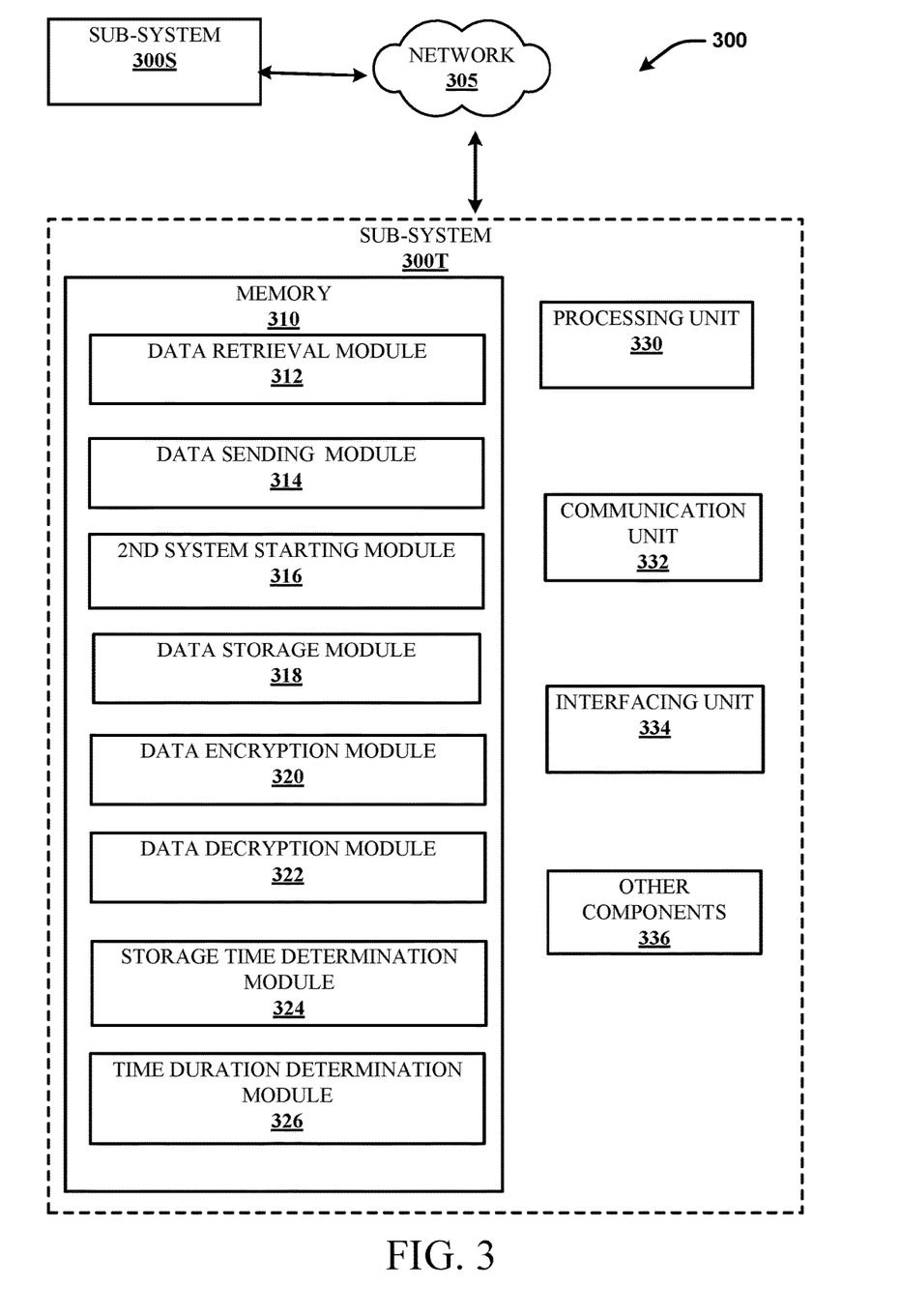
FIG. 3 is a schematic structural diagram of an example data synchronization system.
Figure 4:
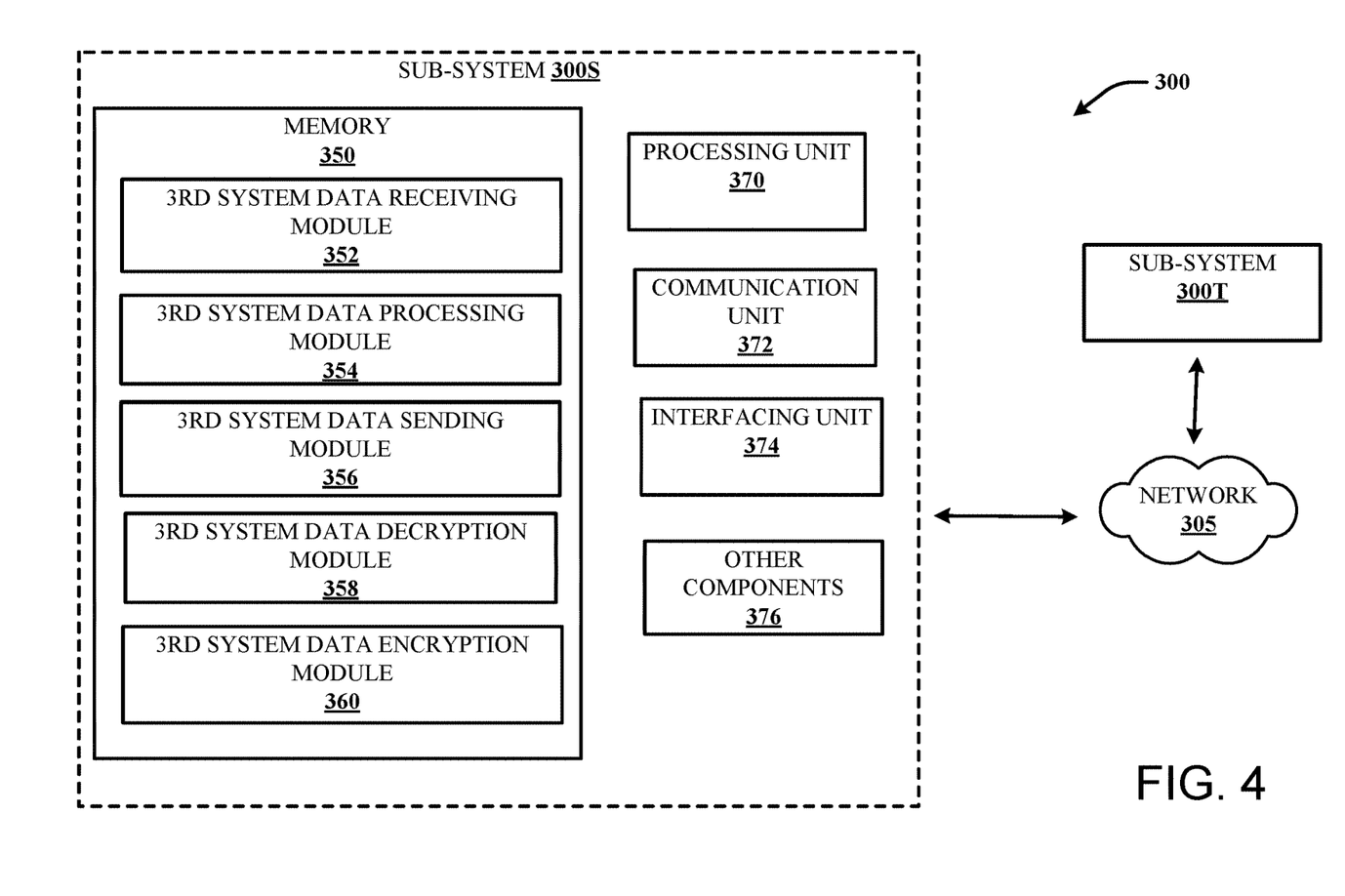
FIG. 4 is a schematic structural diagram of another example data synchronization system.

The data synchronization methods provided in the examples of the present disclosure are described above, and based on the same idea, the examples of the present disclosure further provide data synchronization apparatuses, as shown in FIG. 3 and FIG. 4.

Referring to FIG. 3, a data synchronization system 300 is shown. Data synchronization system 300 may include a subsystem 300T and a sub-system 300S. Subsystem 300T and 300S and the components thereof, respectively, may be located in a same physical location, e.g., a system server computer, or may be located in separated locations and may function together remotely in a distributed computing environment. In an example, sub-system 300T is located in a terminal device (a first device) together with the first system and the second system, between which data synchronization is performed; and sub-system 300S is located in a network device (a second device). Sub-system 300T and sub-system 300S may communicate with one another through network 305.

FIG. 3 shows details of sub-system 300T. As shown in FIG. 3, sub-system 300T may include a memory 310 which stores computer executable instructions, which when executed by a processor, configure the processor and the related computer device to implement a data retrieval module 312, a data sending module 314, a second system starting module 316, a data storage module 318, a data encryption module 320, a data decryption module 322, a storage time determination module 324 and a time duration determination module 326. In addition, sub-system 300T may also include one or more processing unit 330, communication unit 332, interfacing unit 334 and other components 336. Units/modules of sub-system 300T may reside in a single computing machine or may reside in different devices coupled together through communication networks to achieved the relevant functions in a distributed computing environment to control the first device in implementing the below functions.

Data retrieval module 312 is configured to retrieve data from a storage area corresponding to the first system;

Data sending module 314 is configured to send the data to a second device for the second device to process the data;

Data retrieval module 312 is further configured to receive processed data returned by the second device;

Second system starting module 316 is configured to start the second system after the data retrieval module receives the processed data returned by the second device; and Data storage module 318 is configured to store, through the second system, the processed data into a storage area corresponding to the second system.

The first system may be an open system, and the second system may be a closed system; or the first system may be a closed system, and the second system may be an open system.

Data encryption module 320 is configured to encrypt the data before the data sending module 314 sends the data to the second device.

Data retrieval module 312 may be configured to: receive encrypted processed data returned by the second device.

Data decryption module 322 is configured to decrypt the encrypted processed data received by the data retrieval module 312.

Storage time determination module 324 may be configured to retrieve a last storage time when processed data returned by the second device is stored into the storage area corresponding to the second system; and a time duration determination module 326 is configured to determine that a period of time from the storage time to a current time exceeds a set threshold.

In an example, the example sub-system 300T shown in FIG. 3 may be located in the first device including the first system and the second system.

Referring to FIG. 4, sub-system 300S is shown. Sub-system 300S may include a memory 350 which stores computer executable instructions, which when executed by a processor, configure the processor and the related computer device to implement a third system data receiving module 352, a third system data processing module 354, a third system data sending module 356, a third system data decryption module 358, and a third system data encryption module 360. In addition, sub-system 300S may also include one or more processing unit 370, communication unit 372, interfacing unit 374 and other components 376. Units/modules of sub-system 300S may reside in a single computing machine or may reside in different devices coupled together through communication networks to achieved the relevant functions in a distributed computing environment.

Third system data receiving module 352 is configured to receive data sent from the first device, where the data is retrieved by the first device from a storage area corresponding to the first system; third system data processing module 354 is configured to process the data; and third system data sending module 356 is configured to send the processed data to the first device for the first device to, under control of sub-system 300T, upon receiving the processed data, start the second system, and store, through the second system, the processed data into a storage area corresponding to the second system.

The first system may be an open system, and the second system may be a closed system; or the first system may be a closed system, and the second system may be an open system.

Third system data receiving module 352 may be configured to receive encrypted data sent by the first device. Third system data decryption module 358 may be configured to decrypt the encrypted data before third system data processing module 354 processes the data.

Third system data encryption module 360 is configured to encrypt the processed data before third system data sending module 356 sends the processed data to the first device.

Specifically, the sub-system 300S shown in FIG. 4 may be located in the second device.

In conclusion, the terminal of the present disclosure does not directly process data for the purpose of data synchronization, but sends, through a first system, data retrieved from a storage area of the first system to a network device, so that the network device processes the received data and returns the processed data to the terminal; after receiving the processed data returned by the network device, the terminal starts a second system, and stores, through the second system, the processed data into a storage area corresponding to the second system, thus synchronizing the data in the storage area corresponding to the first system to the storage area corresponding to the second system.

Persons skilled in the art should understand that, the examples of the present disclosure may be provided as a method, a system, or a computer program product. Therefore, the present disclosure may be implemented as a completely hardware example, a completely software example, or an example combining software and hardware. Moreover, the present disclosure may employ the form of a computer program product implemented on one or more computer usable storage media (including, but not limited to, a magnetic disk memory, a CD-ROM, an optical memory, and the like) including computer usable program codes.

The present disclosure is described with reference to flowcharts and/or block diagrams of the method, device (system), and computer program product according to the examples of the present disclosure. It should be understood that computer program instructions may be used to implement each process and/or block in the flowcharts and/or block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a function specified in one or more processes in the flowcharts and/or in one or more blocks in the block diagrams.

These computer program instructions may also be stored in a computer readable memory that can instruct the computer or the another programmable data processing device to work in a particular manner, such that the instructions stored in the computer readable memory generate an artifact that includes an instruction apparatus. The instruction apparatus implements a function specified in one or more processes in the flowcharts and/or in one or more blocks in the block diagrams.

These computer program instructions may also be loaded onto a computer or another programmable data processing device, such that a series of operations and processes are performed on the computer or another programmable device, thereby generating computer-implemented processing. Therefore, the instructions executed on the computer or the another programmable device provide steps for implementing a function specified in one or more processes in the flowcharts and/or in one or more blocks in the block diagrams.

In a typical configuration, the computation device includes one or more Central Processing Units (CPUs), an I/O interface, a network interface, and a memory.

The memory may include computer readable media such as a volatile memory, a Random Access Memory (RAM), and/or non-volatile memory, e.g., Read-Only Memory (ROM) or flash RAM, and so on. The memory is an example of a computer readable medium.

Computer readable media include non-volatile, volatile, mobile and non-mobile media, and can implement information storage through any method or technology. The information may be computer readable instructions, data structures, program modules or other data. Examples of storage media of a computer include, but not limited to, Phase-change RAMs (PRAMs), Static RAMs (SRAMs), Dynamic RAMs (DRAMs), other types of RAMs, ROMs, Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, and can be used for storing information accessible to the computation device. According to the definitions herein, the computer readable media exclude transitory media, such as modulated data signals and carriers.

It should be further noted that, the terms "include", "comprise", or any variants thereof are intended to cover a non-exclusive inclusion, such that a process, a method, a product, or a device that includes a series of elements not only includes such elements but also includes other elements not specified expressly, or may further include inherent elements of the process, method, product, or device. In the absence of more restrictions, an element limited by "include a/an . . . " does not exclude other same elements existing in the process, method, product, or device that includes the element.

Persons skilled in the art should understand that, the examples of the present disclosure may be provided as a method, a system, or a computer program product. Therefore, the present disclosure may be implemented as a completely hardware example, a completely software example, or an example combining software and hardware. Moreover, the present disclosure may employ the form of a computer program product implemented on one or more computer usable storage media (including, but not limited to, a magnetic disk memory, a CD-ROM, an optical memory, and the like) including computer usable program codes.

Described above are merely the examples of the present disclosure, which are not used to limit the present disclosure. For those skilled in the art, the present disclosure may have various alterations and changes. Any modification, equivalent replacement, improvement, and the like made within the spirit and principle of the present disclosure shall be included in the scope of the claims of the present disclosure.

The present disclosure may be further understood using the following clauses.

Clause 1: A data synchronization method, characterized by, a first system and a second system both installed in a first device, the method comprising: retrieving data from a storage area corresponding to the first system; sending the data to a second device for the second device to process the data; starting the second system upon receiving processed data returned by the second device; and storing, through the second system, the processed data into a storage area corresponding to the second system.

Clause 2: The method of clause 1, characterized in that the first system is an open system, and the second system is a closed system; or the first system is a closed system, and the second system is an open system.

Clause 3: The method of claim 1, characterized by, before the sending the data to a second device, the method further comprising: encrypting the data.

Clause 4: The method of claim 1, characterized in that the receiving the processed data returned by the second device specifically comprises: receiving encrypted processed data returned by the second device; and before the storing the processed data into a storage area corresponding to the second system, the method further comprises: decrypting the encrypted processed data.

Clause 5: The method of claim 1, characterized by, before the retrieving the data from the storage area corresponding to the first system, the method further comprising: acquiring a last storage time when the processed data returned by the second device is stored into the storage area corresponding to the second system; and determining that a period of time from the last storage time to a current time exceeds a set threshold.

Clause 6: A data synchronization method, characterized by a first system and a second system both installed in a first device, the method comprising: receiving data sent by the first device, wherein the data is retrieved by the first device from a storage area corresponding to the first system; processing the data; and sending the processed data to the first device for the first device to, upon receiving the processed data, start the second system, and store, through the second system, the processed data into a storage area corresponding to the second system.

Clause 7: The method of claim 6, characterized in that the first system is an open system, and the second system is a closed system; or the first system is a closed system, and the second system is an open system.

Clause 8: The method of claim 6, characterized in that the receiving data sent by the first device specifically comprises: receiving encrypted data sent by the first device; and before the processing the data, the method further comprises: decrypting the encrypted data.

Clause 9: The method of claim 6, characterized by, before the sending the processed data to the first device, the method further comprising: encrypting the processed data.

Clause 10: A data synchronization apparatus, characterized by a first system and a second system both installed in the apparatus, the apparatus comprising: a data retrieval module configured to retrieve data from a storage area corresponding to the first system; a data sending module configured to send the data to a second device for the second device to process the data; the data retrieval module being further configured to receive processed data returned by the second device; a second system starting module configured to start the second system after the data retrieval module receives the processed data returned by the second device; and a data storage module configured to store, through the second system, the processed data into a storage area corresponding to the second system.

Clause 11: The apparatus of claim 10, characterized in that the first system is an open system, and the second system is a closed system; or the first system is a closed system, and the second system is an open system.

Clause 12: The apparatus of claim 10, characterized by the apparatus further comprising: a data encryption module configured to encrypt the data before the data sending module sends the data to the second device.

Clause 13: The apparatus of claim 10, characterized in that the data retrieval module is specifically configured to receive encrypted processed data returned by the second device; and the apparatus further comprises: a data decryption module configured to decrypt the encrypted processed data received by the data retrieval module.

Clause 14: The apparatus of claim 10, characterized by the apparatus further comprising: a storage time determination module configured to determine a last storage time when the processed data returned by the second device is stored into the storage area corresponding to the second system; and a time duration determination module configured to determine that a period of time from the last storage time to a current time exceeds a set threshold.

Clause 15: A data synchronization apparatus, characterized by a first system and a second system both installed in a first device, the apparatus comprising: a data receiving module configured to receive data sent by the first device, wherein the data is data retrieved by the first device from a storage area corresponding to the first system; a data processing module configured to process the data; and a data sending module configured to send the processed data to the first device for the first device to, upon receiving the processed data, start the second system, and store, through the second system, the processed data into a storage area corresponding to the second system.

Clause 16: The apparatus of claim 15, characterized in that the first system is an open system, and the second system is a closed system; or the first system is a closed system, and the second system is an open system.

Clause 17: The apparatus of claim 15, characterized in that the data receiving module is specifically configured to receive encrypted data sent by the first device; and the apparatus further comprises: a data decryption module configured to decrypt the encrypted data before the data processing module processes the data.

Clause 18: The apparatus of claim 15, characterized by the apparatus further comprising: a data encryption module configured to encrypt the processed data before the data sending module sends the processed data to the first device.

What is claimed is:

1. A method for synchronizing data between a first system and a second system in a first device, the method comprising:
    retrieving data from a storage area corresponding to the first system;
    sending the data to a second device for the second device to process the data;
    upon receiving processed data returned from the second device:
        temporarily storing the processed data in another storage area independent from the storage area corresponding to the first system and a storage area corresponding to the second system,
        starting the second system and causing the first system to hibernate, and
        storing, through the second system, the processed data into the storage area corresponding to the second system;
    determining a last storage time when the processed data returned from the second device is stored into the storage area corresponding to the second system; and
    determining that a period of time from the last storage time to a current time exceeds a set threshold.

2. The method of claim 1, wherein one of the first system and the second system is an open system and other one of the first system and the second system is a closed system.

3. The method of claim 1, further comprising:
    encrypting the data before the sending the data to a second device.

4. The method of claim 1, wherein the receiving the processed data returned from the second device includes:
    receiving encrypted processed data returned from the second device; and
    decrypting the encrypted processed data.

5. A method for data synchronization between a first system and a second system in a first device, the method comprising:
    receiving data sent from the first device, wherein the data is retrieved by the first device from a storage area corresponding to the first system;
    processing the data; and
    sending processed data to the first device for the first device to, upon receiving the processed data:
        temporarily store the processed data in another storage area independent from the storage area corresponding to the first system and a storage area corresponding to the second system,
        start the second system and cause the first system to hibernate, and
        store, through the second system, the processed data into the storage area corresponding to the second system,
    determining a last storage time when the processed data is stored into the storage area corresponding to the second system; and
    determining that a period of time from the last storage time to a current time exceeds a set threshold.

6. The method of claim 5, wherein one of the first system and the second system is an open system and other one of the first system and the second system is a closed system.

7. The method of claim 5, wherein the receiving data sent from the first device includes:
    receiving encrypted data sent from the first device; and
    decrypting the encrypted data.

8. The method of claim 5, further comprising:
    encrypting the processed data before the sending the processed data to the first device.

9. A data synchronization system, the system comprising:
    a processor; and
    memory storing computer-executable instructions that, when executed by the processor, configure the processor and modules to implement related operations, the modules including:
        a data retrieval module configured to retrieve data from a storage area corresponding to a first system of a first device;
        a data sending module configured to send the data to a second device for the second device to process the data;
        the data retrieval module being further configured to receive processed data returned from the second device and to temporarily store the processed data in another storage area independent from the storage area corresponding to the first system and a storage area corresponding to a second system;
        a second system starting module configured to start the second system of the first device after the data retrieval module receives the processed data returned from the second device, hibernate the first system, and stores in the another storage area;
        a data storage module configured to store, through the second system, the processed data into the storage area corresponding to the second system;
        a storage time determination module configured to determine a last storage time when the processed data returned from the second device is stored into the storage area corresponding to the second system; and
        a time duration determination module configured to determine that a period of time from the last storage time to a current time exceeds a threshold.

10. The system of claim 9, wherein one of the first system and the second system is an open system, and other one of the first system and the second system is a closed system.

11. The system of claim 9, wherein the modules further include:
    a data encryption module configured to encrypt the data before the data sending module sends the data to the second device.

12. The system of claim 9, wherein the data retrieval module is further configured to receive encrypted processed data returned from the second device.

13. The system of claim 12, wherein the modules further include a data decryption module configured to decrypt the encrypted processed data received by the data retrieval module.

14. The system of claim 9, wherein the modules further include a third system in the second device, the third system including:
    a third data receiving module configured to receive data sent from the first device, wherein the data is data retrieved by the first device from a storage area corresponding to the first system;

a third data processing module configured to process the data; and a third data sending module configured to send the processed data to the first device for the first device to, upon receiving the processed data, store, through the second system, the processed data into a storage area corresponding to the second system.

15. The system of claim 14, wherein the third data receiving module is further specifically configured to receive encrypted data sent from the first device.

16. The system of claim 15, wherein the third system further includes a third data decryption module configured to decrypt the encrypted data received from the first device.

17. The apparatus of claim 14, wherein the third system further includes a third data encryption module configured to encrypt the processed data before the data sending module sends the processed data to the first device.

* * * * *